US011284612B2

(12) United States Patent
Fox et al.

(10) Patent No.: US 11,284,612 B2
(45) Date of Patent: Mar. 29, 2022

(54) IMPLEMENT HAVING AN ELECTRODE AND GROUND-ENGAGING TOOLS

(71) Applicant: CNH Industrial America LLC, New Holland, PA (US)

(72) Inventors: Jason Fox, Chicago, IL (US); Joseph Heitzig, Washington, IL (US); Trevor P. Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 113 days.

(21) Appl. No.: 16/708,919

(22) Filed: Dec. 10, 2019

(65) Prior Publication Data
US 2021/0169064 A1 Jun. 10, 2021

(51) Int. Cl.
*A01M 21/04* (2006.01)
*A01B 47/00* (2006.01)
*A01B 79/02* (2006.01)
*A01B 49/02* (2006.01)

(52) U.S. Cl.
CPC ........... *A01M 21/046* (2013.01); *A01B 47/00* (2013.01); *A01B 79/02* (2013.01); *A01B 49/027* (2013.01)

(58) Field of Classification Search
CPC .... A01M 21/046; A01B 47/00; A01B 49/027; A01B 79/02
See application file for complete search history.

(56) References Cited

U.S. PATENT DOCUMENTS

| 2,484,443 | A |   | 10/1949 | Baker |
| 2,588,561 | A |   | 3/1952  | Opp |
| 2,596,504 | A | * | 5/1952  | Opp ................... A01M 21/046 47/1.3 |
| 2,682,729 | A |   | 7/1954  | Poynor |
| 3,559,337 | A | * | 2/1971  | Marcoux et al. ... A01M 21/046 47/1.3 |
| 3,919,806 | A |   | 11/1975 | Pluenneke et al. |
| 4,047,326 | A | * | 9/1977  | Tibbs .................. A01M 21/046 47/1.3 |
| 4,094,095 | A | * | 6/1978  | Dykes ................. A01M 21/046 126/271.1 |
| 4,177,603 | A |   | 12/1979 | Dykes |
| 4,338,743 | A | * | 7/1982  | Gilmore ............. A01M 21/046 47/1.3 |
| 4,428,150 | A |   | 1/1984  | Geiersbach et al. |
| 5,806,294 | A |   | 9/1998  | Strieber |
| 6,237,278 | B1 |  | 5/2001  | Bertil et al. |
| 9,936,686 | B2 |  | 4/2018  | Crisp et al. |

(Continued)

FOREIGN PATENT DOCUMENTS

FR 2487168 1/1982

*Primary Examiner* — Gary S Hartmann
(74) *Attorney, Agent, or Firm* — Rebecca L. Henkel; Rickard K. DeMille (57) ABSTRACT

A system for controlling vegetation within a field may include an implement frame and a ground-engaging tool supported on the implement frame. The ground-engaging tool may, in turn, be configured to perform an agricultural operation on the field as the implement frame is moved across the field. Furthermore, the system may include an electrode supported on the implement frame. As such, when a plant within the field contacts the electrode as the implement frame is moved across the field, an electric current is discharged from the electrode into the plant.

12 Claims, 6 Drawing Sheets

(56) References Cited

U.S. PATENT DOCUMENTS

| | | | |
|---|---|---|---|
| 10,188,045 B1 | 1/2019 | Flagler et al. | |
| 10,717,119 B2 * | 7/2020 | Guo | A01B 47/00 |
| 11,083,185 B2 * | 8/2021 | Diprose | A01M 21/04 |
| 2003/0150156 A1 | 8/2003 | Flagler et al. | |
| 2018/0055036 A1 | 3/2018 | DiProse | |
| 2018/0139947 A1 | 5/2018 | Albert et al. | |
| 2018/0325091 A1 * | 11/2018 | Kroeger | A01M 21/046 |
| 2020/0390081 A1 * | 12/2020 | Tomm | A01B 49/06 |

* cited by examiner

IMPLEMENT HAVING AN ELECTRODE AND GROUND-ENGAGING TOOLS

FIELD OF THE INVENTION

The present disclosure generally relates to systems and method for controlling vegetation within a field and, more particularly, to systems and methods for controlling vegetation present within a field using electric current and ground-engaging tools.

BACKGROUND OF THE INVENTION

The conditions of a field impact the health and/or yield of the crops growing within the field. For example, the presence of weeds or other unwanted vegetation within the field may result in weaker crops and smaller crop yields as the crops must compete with the weeds for water and soil nutrients. As such, it is generally desirable to minimize the number and/or coverage of the weeds present within the field.

In this respect, farmers typically perform various weed control operations on the field. For example, farmers may perform a tillage operation on the field to mechanically damage or kill weeds present within the field. Specifically, as a tillage operation is being performed, ground-engaging tools may disturb or otherwise work the soil present within the field in a manner that cuts or mechanically damages the weeds present within the field. However, large weeds may be resilient enough to grow back after incurring mechanical damage from the ground-engaging tools. Moreover, the tillage operation may move around smaller weeds without mechanically damaging such weeds. To supplement the weed control provided by the tillage operation, many farmers spray herbicides or other chemicals onto the field to kill the weeds growing therein. However, certain types of weeds (e.g., water hemp and pigweed) may be resistant to such herbicides/chemicals.

Accordingly, an improved system and method for controlling vegetation within a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling vegetation within a field. The system may include an implement frame and a ground-engaging tool supported on the implement frame, with the ground-engaging tool configured to perform an agricultural operation on the field as the implement frame is moved across the field. Furthermore, the system may include an electrode supported on the implement frame. As such, when a plant within the field contacts the electrode as the implement frame is moved across the field, an electric current may be discharged from the electrode into the plant.

In another aspect, the present subject matter is directed to a tillage implement. The tillage implement may include a frame, a ground-engaging tool supported on the frame, with the ground-engaging tool configured to perform a tillage operation of the field as the tillage implement is moved across the field in a direction of travel. Furthermore, the tillage implement may include an electrode supported on the frame forward of the ground-engaging tool relative to the direction of travel. As such, when a plant within the field contacts the electrode as the tillage implement is moved across the field, an electric current may be discharged from the electrode into the plant and the ground-engaging tool subsequently engages the plant.

In a further aspect, the present subject matter is directed to a method for controlling vegetation within a field. The method may include moving an agricultural implement across the field such that a ground-engaging tool mounted on the agricultural implement performs an agricultural operation on the field. Furthermore, the method may include contacting a plant present within the field with an electrode mounted on the agricultural implement such that an electric current is discharged from the electrode into the plant. Additionally, the method may include engaging the plant with the ground-engaging tool after the electric current has been discharged into the plant.

These and other features, aspects and advantages of the present technology will become better understood with reference to the following description and appended claims. The accompanying drawings, which are incorporated in and constitute a part of this specification, illustrate embodiments of the technology and, together with the description, explain the principles of the technology.

BRIEF DESCRIPTION OF THE DRAWINGS

A full and enabling disclosure of the present technology, including the best mode thereof, directed to one of ordinary skill in the art, is set forth in the specification, which refers to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling vegetation within a field. Specifically, in several embodiments, the disclosed system may include one or more first electrodes (e.g., a bar(s) or a rod(s)) supported on an agricultural implement such that the first electrode(s) contacts weeds or other unwanted plants/vegetation as the implement travels across the field. An electric power supply (e.g., a battery or a generator) may be configured to supply electric current to the first electrode(s). Furthermore, the system may include one or more second electrodes supported on the implement such that the second electrode(s) contact the soil as the implement is moved across the field. For example, in one embodiment, the second electrode(s) may correspond to a ground-engaging tool(s) (e.g., a disk blade(s)) supported on the implement. In another embodiment, the second electrode(s) may correspond to a bar(s) or a rod(s) that is separate from the ground-engaging tool(s) of the implement.

In accordance with aspects of the present subject matter, the disclosed systems and methods may provide multiple modes of killing or otherwise damaging weeds. More specifically, as the implement is towed across the field, the weeds present within the field may contact the first electrode(s). Upon contact with a weed, the corresponding first electrode may discharge an electric current into the weed, thereby killing or damaging the weed. Thereafter, the discharged electric current may flow from the weed and into the soil. In this respect, the second electrode(s) may complete the circuit between the soil and the electric power source. Additionally, after the electric current has been discharged into the weed, one or more ground-engaging tools of implement may contact or otherwise engage the weed to further damage the weed.

Figure 1:
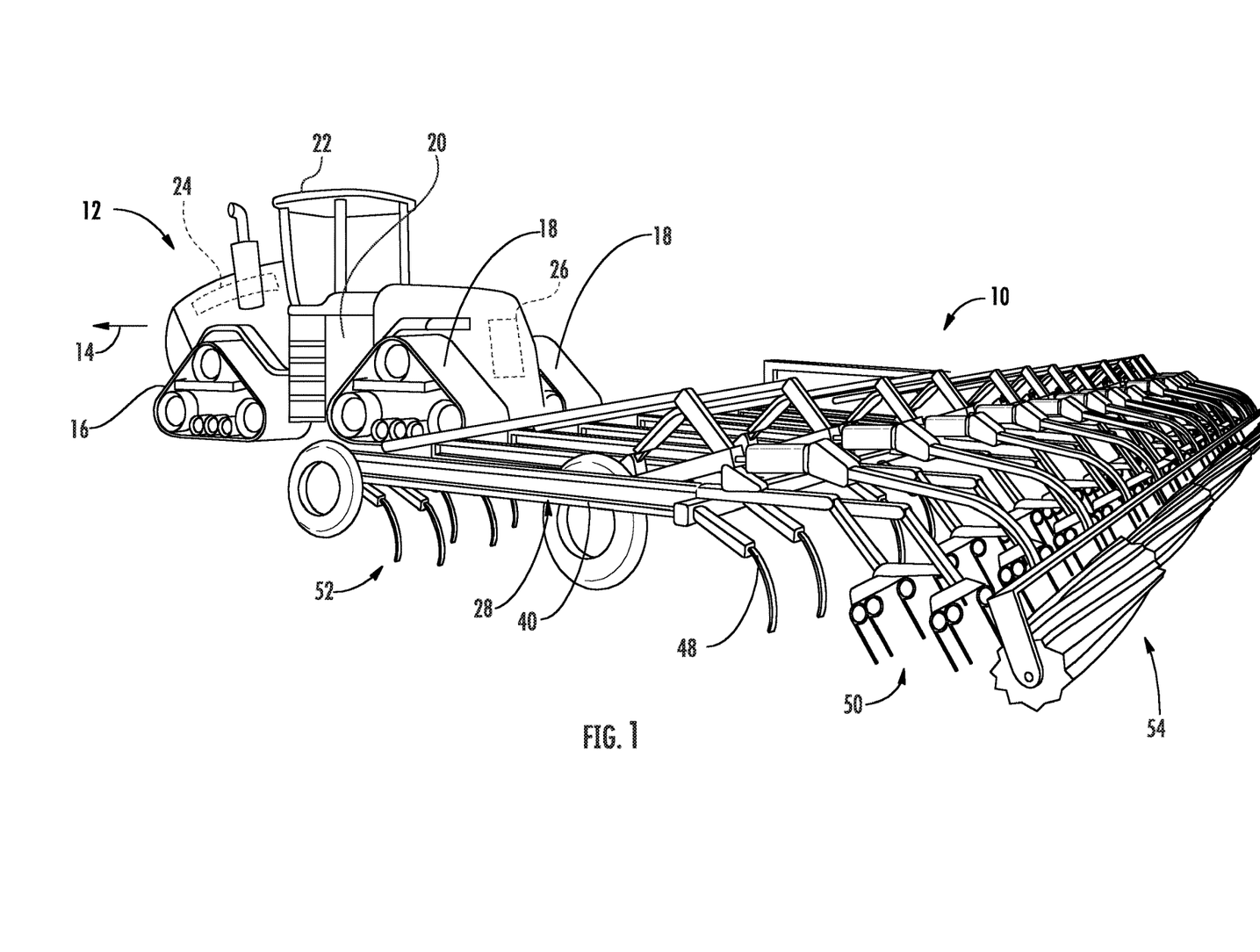
FIG. 1 illustrates a perspective view of one embodiment of an agricultural implement coupled to a work vehicle in accordance with aspects of the present subject matter.
Figure 2:
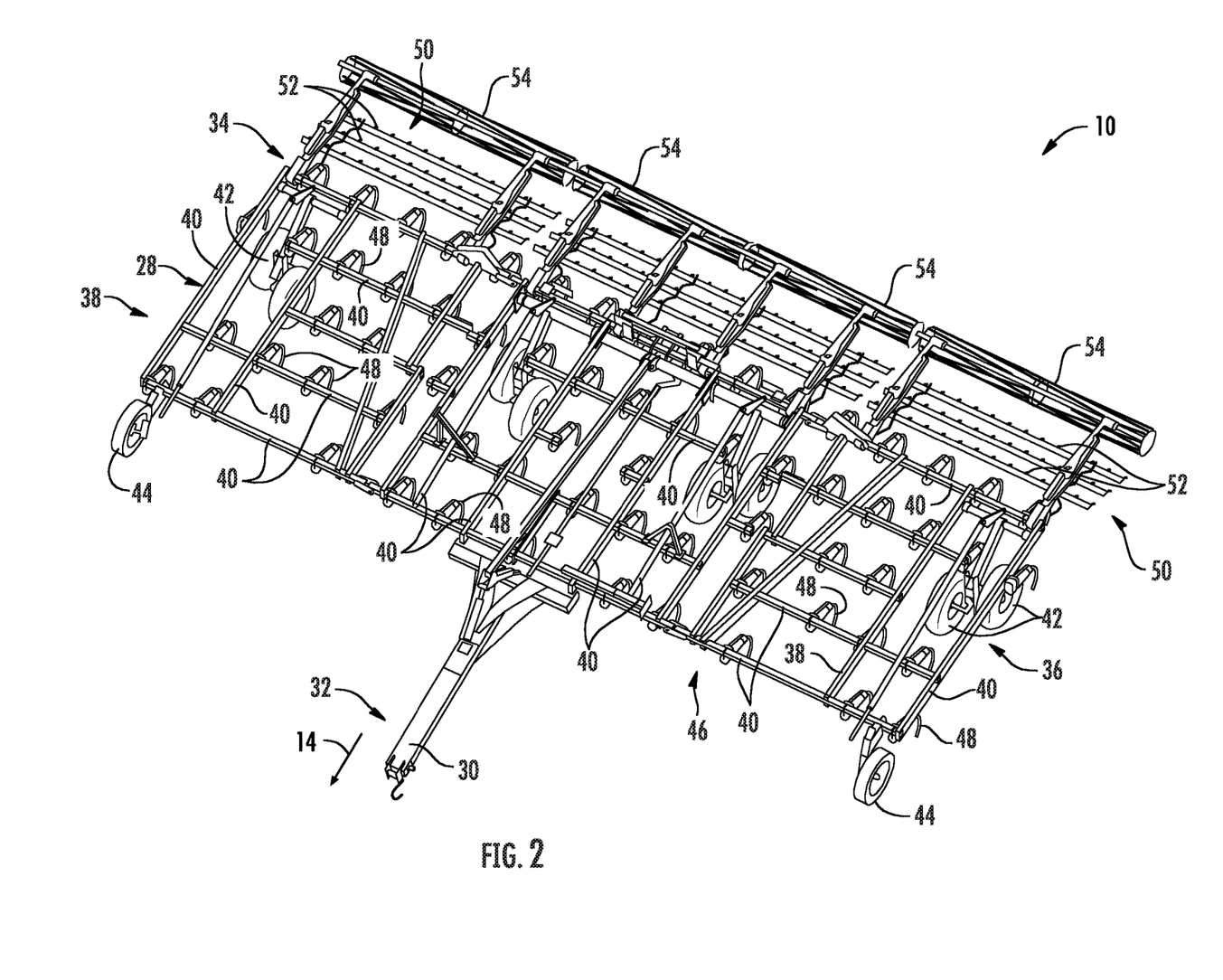
FIG. 2 illustrates an alternative perspective view of an agricultural implement shown in FIG. 1, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (indicated by arrow 14) by the work vehicle 12. As shown, the implement 10 may be configured as a tillage implement (e.g., a field cultivator), and the work vehicle 12 may be configured as an agricultural tractor. However, in other embodiments, the implement 10 may be configured as any other suitable type of implement, such as an inter-row cultivator, a strip tiller, and/or the like. Similarly, the work vehicle 12 may be configured as any other suitable type of vehicle.

As shown in FIG. 1, the work vehicle 12 may include a pair of front track assemblies 16 (one is shown), a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 12 and/or one or more components of the agricultural implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Moreover, as shown in FIGS. 1 and 2, the implement 10 may include the frame 28 configured to be towed by the vehicle 12 via a pull hitch or tow bar 30 in the direction of travel 14. As shown, the frame 28 may extend longitudinally between a forward end 32 and an aft end 34. The frame 28 may also extend laterally between a first side 36 and a second side 38. In this respect, the frame 28 generally includes a plurality of structural frame members 40, such as beams, bars, and/or the like, configured to support or couple to a plurality of components. Additionally, a plurality of wheels may be coupled to the frame 28, such as a set of centrally located wheels 42 and a set of front pivoting wheels 44, to facilitate towing the implement 10 in the direction of travel 14.

Additionally, in several embodiments, the frame 28 may be configured to support a cultivator 46, which may be configured to till or otherwise break the soil over which the implement 10 travels to create a seedbed. Furthermore, the cultivator 46 may be configured to engage weeds and other unwanted plants/vegetation present within the field in a manner kills or damages the weeds. In this respect, the cultivator 46 may include a plurality of ground-engaging shanks 48, which are pulled through the soil as the implement 10 moves across the field in the direction of travel 14. As shown, the ground-engaging shanks 48 may be spaced apart from one another longitudinally between the forward end 32 and the aft end 34 of the frame 28 and/or between the first side 36 and the second side 38 of the frame 28.

As shown in FIGS. 1 and 2, the implement 10 may also include one or more harrows 50. In general, the harrow(s) 50 may be configured to be pivotably coupled to the frame 28. The harrow(s) 50 may include a plurality of ground-engaging elements 52, such as tines or spikes, configured to level or otherwise flatten any windrows or ridges in the soil created by the cultivator 46. Specifically, the ground-engaging elements 52 may be configured to be pulled through the soil as the implement 10 moves across the field in the direction of travel 14. However, in alternative embodiments, the implement 10 may include any other suitable number of harrows 50.

Moreover, in one embodiment, the implement 10 may include one or more baskets or rotary firming wheels 54. In general, the basket(s) 54 may be configured to reduce the number of clods in the soil and/or firm the soil over which the implement 10 travels. As shown, each basket 54 may be pivotably coupled to one of the harrows 54. Alternately, the basket(s) 54 may be pivotally coupled to the frame 28 or any other suitable location of the implement 10. However, in alternative embodiments, the implement 10 may include any other suitable number of basket(s) 54.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of implement configuration and/or vehicle configuration.

Figure 3:
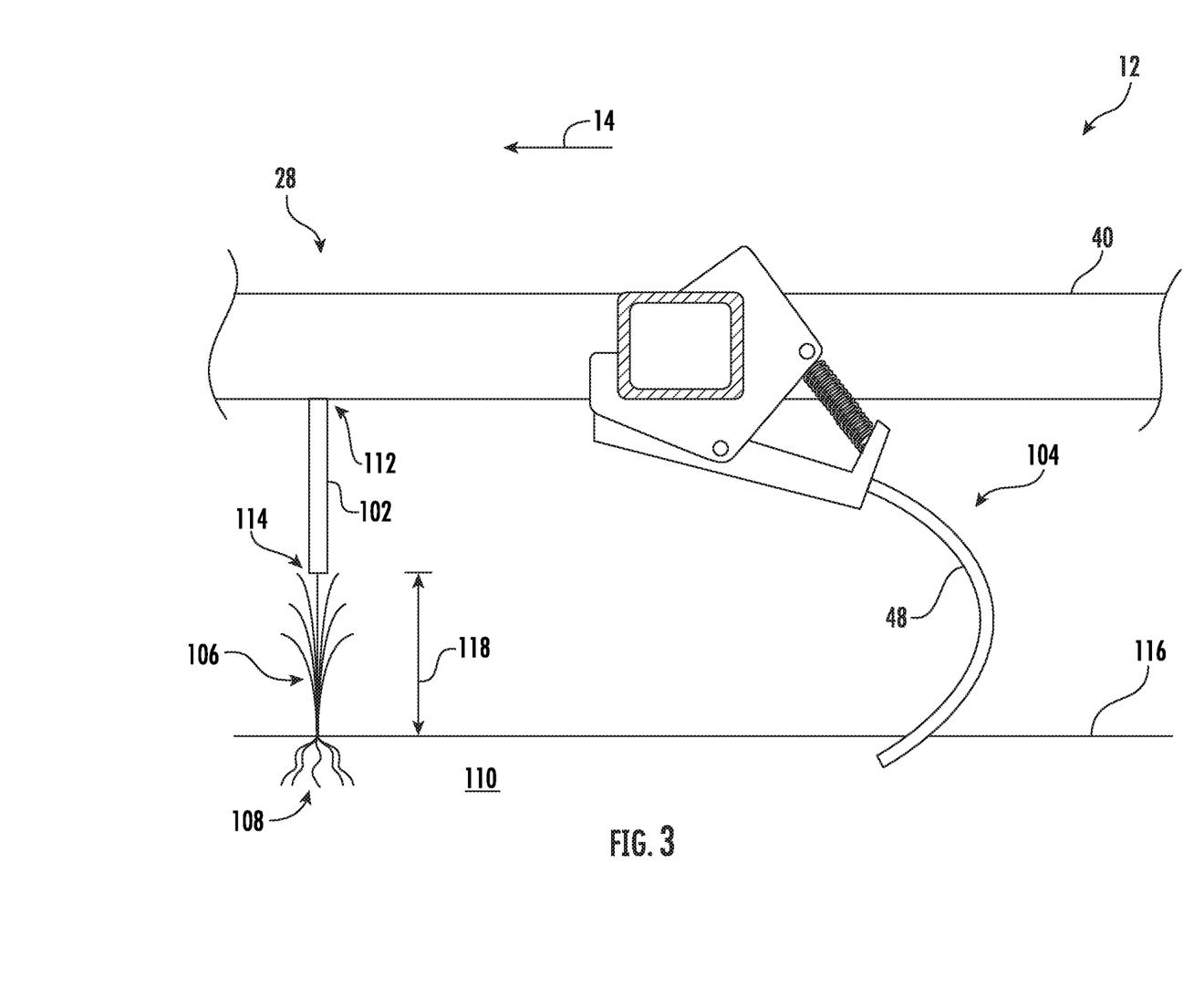
FIG. 3 illustrates a side view of one embodiment of first and second electrodes supported on a frame of an agricultural implement in accordance with aspects of the present subject matter, particularly illustrating the second electrode configured as a ground-engaging tool of the implement.
Figure 4:
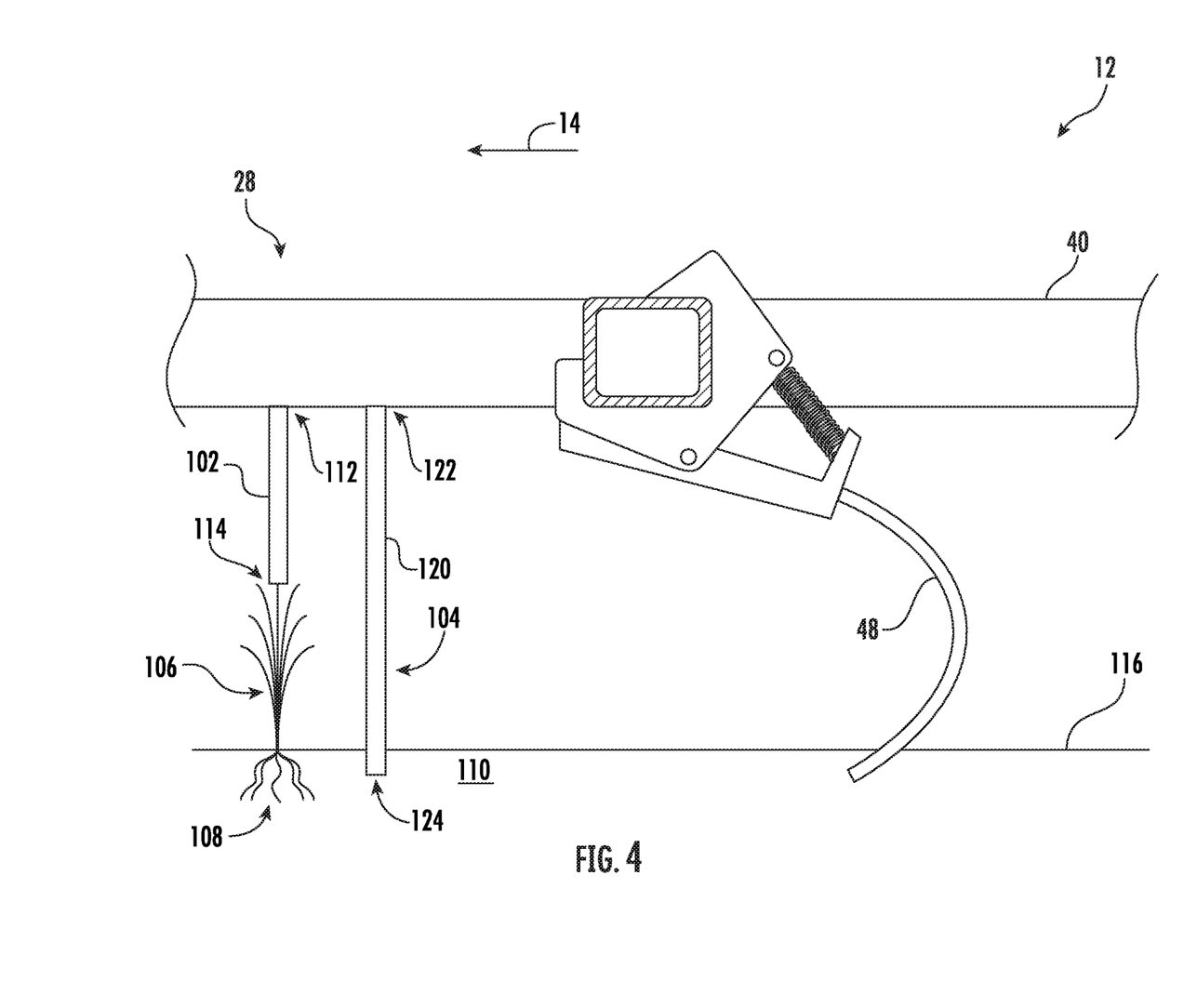
FIG. 4 illustrates a side view of another embodiment of first and second electrodes supported on a frame of an agricultural implement in accordance with aspects of the present subject matter, particularly illustrating the second electrode configured as a separate ground-engaging member.

Referring now to FIGS. 3 and 4, side views of differing embodiments of first and second electrodes 102, 104 installed on an agricultural implement 10 are illustrated in accordance with aspects of the present subject matter. Specifically, FIG. 3 illustrates one embodiment of the first and second electrodes 102, 104 in which the second electrode 104 is configured as one of the ground-engaging tools of the implement 10. Additionally, FIG. 4 illustrates another embodiment of the first and second electrodes 102, 104 in which the second electrode 104 is configured as a separate ground-engaging member.

As shown in FIG. 3, one or more first electrodes 102 may be supported on the frame 28 of the implement 10. As will be described below, the first electrode(s) 102 may be electrically coupled to an electric power source (e.g., a battery or a generator) positioned on the implement 10 or the vehicle 12. In this respect, when a first electrode 102 contacts a weed 106 or other unwanted plants/vegetation present within a field, electric current may flow from the electric power source to the first electrode 102. This electric current may then be discharged from the first electrode 102 into the weed 106. Thereafter, the discharged electric current may flow through the weed 106 and its roots 108 and into soil 110 present within the field. Such flow of electric current through the weed 106 and its roots 108 may kill or otherwise damage the weed 106.

In several embodiments, the first electrode(s) 102 may be positioned forward of the ground-engaging tools of the implement 10. More specifically, as shown in FIG. 3, the first electrode(s) 102 may be coupled to and/or supported on the frame 28 of the implement 10 at location(s) forward of the shanks 48, the harrow(s) 50, and the basket(s) 54 of the implement 10 relative to the direction of travel 14 of the implement 10. In this respect, as the implement 10 travels across the field in the direction of travel 14, the first electrode(s) 102 may initially contact the weeds present within the field, thereby discharging an electric current(s) into the weeds to kill or damage the weeds. After the electric current(s) has been discharged into such weeds (and the weeds have been killed or incurred damage due to such electric current(s)), the shanks 48 may engage or otherwise contact the weeds to cause further damage to the weeds. Thus, the combination of the initial electric damage to the weeds due the discharged electric current(s) and the subsequent mechanical damage to the weeds due to contact with the shanks 48 may result in substantially decreased numbers and/or coverage of weeds present within the field compared to when only a single weed control method is used. However, in alternative embodiments, the first electrode(s) 102 may be positioned at any other suitable location(s) on the implement 10. For example, in one embodiment, the first electrode(s) 102 may be positioned aft of the shanks 48 (i.e., the cultivator 46) and forward of the harrow(s) 50 and the basket(s) 54.

The first electrode(s) 102 may correspond to any suitable structure(s) capable of discharging an electric current into a plant upon contact with the plant. For example, in several embodiments, the first electrode(s) 102 is configured as a rod-like or bar-like metallic member(s) supported on the implement frame 28. Specifically, in such embodiments, each first electrode 102 may include a first end 112 coupled to and/or positioned proximal to one or the frame member 40 of the implement frame 28. Furthermore, each first electrode 102 may include an opposed, second end 114 positioned distal to the implement frame 28. In one embodiment, the second end 114 of each first electrode 102 may be positioned above and spaced apart from a surface 116 of the field by a distance (indicated by arrow 118). In such an embodiment, the first electrodes) 102 may be vertically oriented. The distance 118 may, in turn, be selected such that the second end(s) 114 of the first electrode(s) 102 may contact weeds of a particular height, size, and/or maturity. In one embodiment, the distance 118 may be approximately one foot. However, in other embodiments, the second end(s) 114 of the first electrode(s) 102 may be in contact with the soil 110 present within the field. As the implement 10 travels across the field, the second end(s) 114 of the first electrode(s) 102 may be configured to contact weeds or other unwanted plants/vegetation (e.g., the weed 106) present within the field. Upon contact between a first electrode 102 and a weed 106, an electric current may flow from the first end. 112 of such first electrode 102 to the second end 114 of such first electrode 102 before being discharged from the first electrode 102 into the weed 106. However, in alternative embodiments, the first electrode(s) 102 may correspond to any suitable structure(s) capable of discharging electric current into a plant, such as a wire(s). Furthermore, the first electrode(s) 102 may be mounted in any other suitable manner to the implement frame 28. For example, in one embodiment, first electrode(s) 102 may be mounted horizontally such that its first and seconds ends 112, 114 are positioned at the same height relative to the field surface 116.

Furthermore, it should be appreciated that any suitable number of first electrodes 102 may be supported on the frame 28 of the implement 10. For example, in one embodiment, a first electrode 102 may be laterally aligned with each shank 48. In such an embodiment, each weed contacted by one of the first electrodes 102 may subsequently be contacted by one of the shanks 48. However, in alternative embodiments, any other suitable number of first electrodes 102 may be supported on the implement 10.

Referring now to FIGS. 3 and 4, as mentioned above, one or more second electrodes 104 may be supported on may be supported on the frame 28 of the implement 10. As will be described below, the second electrode(s) 104 may be configured to contact the soil 110 present within the field as the implement 10 travels across the field. Moreover, the second electrode(s) 104 may be electrically coupled to the electric power source. In this respect, the second electrode(s) 104 may be configured to form an electric circuit that allows the electric current to be discharged from the first electrode(s) into the weeds. As such, when a first electrode 102 contacts a weed 106, electric current flows from the electric power source to the first electrode and is subsequently discharged into the weed 106. Thereafter, the discharged electric current may flow through the weed 106 and its roots 108 and into the soil 110 of the field. The electric current may then flow from the soil 110 and through the second electrode 104 to the electric power source.

The second electrode(s) 104 may correspond to any suitable structure(s) capable of transmitting electric current from the soil of the field to an electric power source. For example, as shown in FIG. 3, in one embodiment, the second electrode(s) 104 may be configured as a ground-engaging tool, such a shank(s) 48, of the implement 10. By using a ground-engaging tool(s) as the second electrode(s) 104, the need for a separate ground-engaging member(s) that does not perform an agricultural operation (e.g., a tillage operation) on the field may be eliminated. Furthermore, as shown in FIG. 4, in another embodiment, the second electrode(s) 104 may be configured as a separate ground-engaging member(s) 120 that does not perform an agricultural operation on the field. For example, the ground-engaging member(s) 120 may be configured as a rod-like or bar-like metallic member(s) supported on the implement frame 28. As such, each ground-engaging member 120 may include a first end 122 coupled to and/or positioned proximal to one or the frame member 40 of the implement frame 28. Furthermore, each ground-engaging member 120 may include an opposed, second end 124 positioned distal to the implement frame 28, with the second end 124 configured to contact and/or penetrate the surface 116 of the field. However, in alternative embodiments, the second electrode(s) 104 may correspond to any other suitable structure(s) capable of transmitting electric current from the soil of the field to an electric power source.

In addition, it should be appreciated that any suitable number of second electrodes 104 may be supported on the frame 28 of the implement 10. For example, in one embodiment, a single second electrode 104 may be supported on the frame 28. However, in alternative embodiments, any other suitable number of second electrodes 104 may be supported on the implement 10, such as two or more second electrodes 104.

Figure 5:
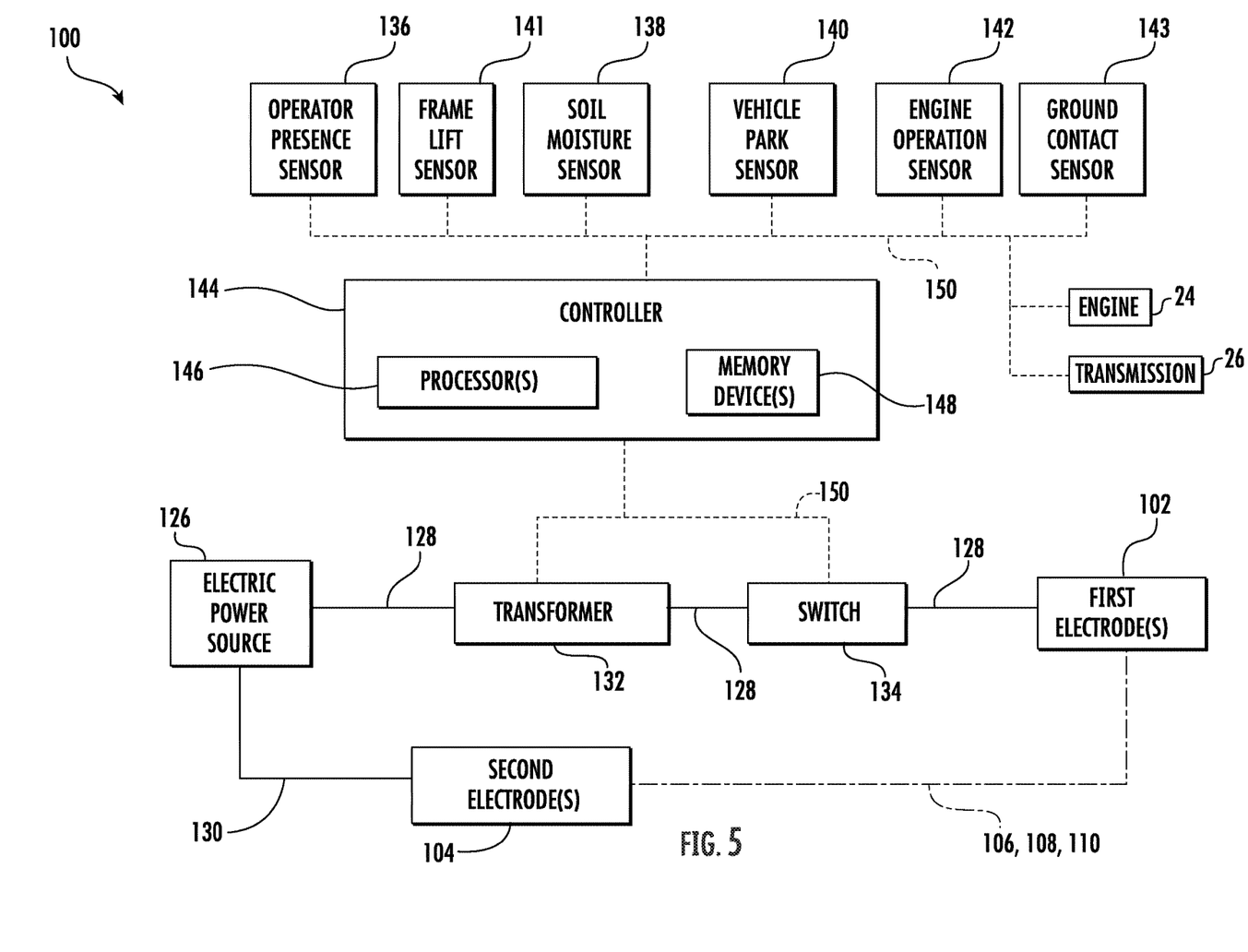
FIG. 5 illustrates a schematic view of one embodiment of a system for controlling vegetation within a field in accordance with aspects of the present subject matter.

Referring now to FIG. 5, a schematic view of one embodiment of a system 100 for controlling vegetation within a field is illustrated in accordance with aspects of the present subject matter. In general, the system 100 will be described herein with reference to the implement 10 and the vehicle 12 described above with reference to FIGS. 1 and 2 and the first and second electrodes 102, 104 described above with reference to FIGS. 3 and 4. However, it should be appreciated by those of ordinary skill in the art that the disclosed system 100 may generally be utilized with implements having any other suitable implement configuration, vehicles having any other suitable vehicle configuration, and/or electrodes having any other suitable electrode configuration.

As shown in FIG. 5, the system 100 may include an electric power source 126 configured to generate an electric current to be discharged into from the first electrode(s) 102 into the weeds present within the field. Specifically, in several embodiments, the electric power source 126 may be electrically coupled to the first and second electrodes 102, 104 via electrical links 128, 130 (e.g., electrical wires/cables), respectively. Moreover, as described above, when a weed 106 contacts one of the first electrodes 102, the weed 106, its roots 108, and the soil 110 electrically couple the first and second electrodes 102, 104. In this respect, when the weed 106 contacts the first electrode 102, electric current may flow from the electrical power source 126 through the electrical link 128 to the first electrode(s) 104. Thereafter, this electric current may be discharged from the first electrode 102 and flow through the weed 106, its roots 108, and into the soil 110. The electrical current may then flow from the soil 110 through the second electrode(s) 104 and the electrical link 130 back to electric power source 126.

The electric power source 126 may correspond to any suitable device(s) configured to generate an electric current. Specifically, in several embodiments, the electric power source 126 may correspond to a suitable generator. For example, in one embodiment, the electric power source 126 may correspond to an alternator (not shown) of the work vehicle 12. In another embodiment, the electric power source 126 may correspond to a separate generator (not shown) mounted on the implement 10. In other embodiments, the electric power source 126 may correspond to one or more batteries. However, in alternative embodiments, the electric power source 126 may correspond to any other suitable device(s) configured to generate an electric current.

In several embodiments, the system 100 may include a transformer 132. In general, the transformer 132 may be configured to adjust one or more parameters of the electric current generated by the electric power source 126. For example, the transformer 132 may be configured to modulate or adjust the voltage and/or the frequency of the generated electric current. As such, the transformer may be electrically coupled between the electric power source 126 and the first electrode(s) 102, such as in series with the electrical link 128. Additionally, the transformer 132 may correspond to any suitable device(s) configured to adjust a parameter(s) of the generated electric current. For example, the transformer 132 may correspond to a laminated core transformer, a toroidal transformer, an autotransformer, and/or the like.

Moreover, the system 100 may include a switch 134 configured to selectively permit and halt the flow of electric current from the electric power source 126 to the first electrode(s) 102. Specifically, in several embodiments, the switch 134 may be provided in series with the electrical link 128. As such, when the switch 134 is closed, electric current generated by the electric power source 126 may flow to the first electrode(s) 102. Conversely, the flow electric current from the electric power source 126 to the first electrode(s) 102 may be halted when the switch 134 is opened.

Furthermore, the system 100 may include one or more sensors configured to detect or otherwise capture data associated with an unsafe operating condition of the implement 10 and/or the vehicle 12. In general, an unsafe operating condition may be a condition associated with the implement 10, the vehicle 12, and/or the field in which it may be desirable to halt the flow of electric current to the first electrode(s) 102. As will be described below, when an unsafe operating condition is detected, the switch 134 may be opened, thereby preventing electric current from flowing the first electrode(s) 102.

The sensor(s) may include an operator presence sensor 136 configured to detect when the operator is present within the cab 22 of the vehicle 12. Specifically, when the operator of the implement/vehicle 10/12 leaves the seat positioned within the cab 22, it may be desirable to halt the flow of electric current to the first electrode(s) 102. In this respect, when the operator presence sensor 136 has detected that the operator has left the seat, the switch 134 may be opened. For example, in one embodiment, the operator presence sensor 136 correspond to a contact sensor that detects when an operator is present in the seat (e.g., the contact sensor opens or closes when the operator is present within the seat). However, in alternative embodiments, the operator presence sensor 136 may be configured as any other suitable device(s) for sensing or detecting presence of the operator in the cab 22 (or the lack thereof).

Additionally, the sensor(s) may include a soil moisture sensor 138 configured to capture data associated with the moisture content the field across which the implement/vehicle 10/12 is traveling. Specifically, when the field across which the vehicle/implement 10/12 is traveling has standing water or otherwise high moisture content, it may be desirable to halt the flow of electric current to the first electrode(s) 102. In this respect, when the soil moisture sensor 138 has detected standing water, the switch 134 may be opened. For example, in one embodiment, the soil moisture sensor 138 may be configured as an optical sensor configured to capture data associated with one or more characteristics of light reflected by the soil, with such characteristics generally being indicative of the soil moisture content. However, in alternative embodiments, the soil moisture sensor 138 may be configured as any other suitable device for sensing or detecting the moisture content of the field.

Furthermore, the sensor(s) may include a vehicle park sensor 140 configured to detect when the transmission 26 of the vehicle 12 in park or otherwise not in a forward or reverse gear. Specifically, when the transmission 26 of the vehicle 12 is in park, it may be desirable to halt the flow of electric current to the first electrode(s) 102. In this respect, when the vehicle park sensor 140 has detected that the transmission 26 is in park, the switch 134 may be opened. For example, in one embodiment, the vehicle park sensor 140 correspond to a position sensor that detects position of a gear selector/shifter positioned within the cab 22. However, in alternative embodiments, the vehicle park sensor 140 may be configured as any other suitable device(s) for sensing or detecting when the transmission 26 is in park.

Furthermore, the sensor(s) may include a frame lift sensor 141 configured to detect when the frame 28 of the implement 10 is in a raised or lifted position. Specifically, when the frame 28 is in the raised position, the ground-engaging tool(s) (e.g., the shank(s) 48) of the implement 10 are lifted out of the soil such that the tool(s) are no longer being deflected by the soil. In such instances, it may be desirable to halt the flow of electric current to the first electrode(s) 102. In this respect, when the frame lift sensor 141 has detected that the frame 28 is in the raised position, the switch 134 may be opened. For example, in one embodiment, the frame lift sensor 141 correspond to a position sensor that detects position of the wheels 42 relative to the frame 28, with such position being indicative of the height of the frame 28 relative to the field surface. However, in alternative embodiments, the frame lift sensor 141 may be configured as any other suitable device(s) for sensing or detecting when the frame 28 is in a raised position.

In addition, the sensor(s) may include an engine operation sensor 142 configured to detect when the engine 24 of the vehicle 12 is currently operating or running. Specifically, when the engine 24 is shut off, it may be desirable to halt the flow of electric current to the first electrode(s) 102. In this respect, when the engine operation sensor 142 has detected that the engine 24 is not operating, the switch 134 may be opened. For example, in one embodiment, the engine operation sensor 142 may correspond to an engine speed sensor that detects the rotational speed of the engine 24, with an engine speed of zero indicating that the engine 24 has been shut off. However, in alternative embodiments, the engine operation sensor 142 may be configured as any other suitable device(s) for sensing or detecting when the engine 24 is currently operating.

Moreover, the sensor(s) may include a ground contact sensor 143 configured to detect when the ground-engaging tool(s) (e.g., the shank(s) 48) of the implement 10 and/or the second electrode(s) 104 are not in contact with the soil. Specifically, when the ground-engaging tool(s) and/or the second electrode(s) 104 are lifted out of the soil, it may be desirable to halt the flow of electric current to the first electrode(s) 102. In this respect, when the ground contact sensor 143 detects that the ground-engaging tool(s) and/or the second electrode(s) 104 are not in contact with the soil, the switch 134 may be opened. For example, in one embodiment, the ground contact sensor 143 correspond to a position sensor that detects the position of the ground-engaging tool(s) and/or the second electrode(s) 104 to the field surface. However, in alternative embodiments, the ground contact sensor 143 may be configured as any other suitable device(s) for sensing or detecting when the when the ground-engaging tool(s) and/or the second electrode(s) 104 are lifted out of the soil. Additionally, in other embodiments, the system 100 may include any other suitable sensor(s) or sensing device(s) for detecting or capturing data associated with an unsafe operating condition in which it may be desirable to halt the flow of electric current to the first electrode(s) 102, such as a sensor(s) that detects when a pedestrian is approaching the implement/vehicle 10/12.

In accordance with aspects of the present subject matter, the system 100 may include a controller 144 positioned on and/or within or otherwise associated with the implement 10 or the vehicle 12. In general, the controller 144 may comprise any suitable processor-based device known in the art, such as a computing device or any suitable combination of computing devices. Thus, in several embodiments, the controller 144 may include one or more processor(s) 146 and associated memory device(s) 148 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 148 of the controller 144 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 148 may generally be configured to store suitable computer-readable instructions that, when implemented by the processor(s) 146, configure the controller 144 to perform various computer-implemented functions.

In addition, the controller 144 may also include various other suitable components, such as a communications circuit or module, a network interface, one or more input/output channels, a data/control bus and/or the like, to allow controller 144 to be communicatively coupled to any of the various other system components described herein (e.g., the engine 24; the transmission 26; the transformer 132; the switch 134; and the sensors 136, 138, 140, 141, 142, 143). For instance, as shown in FIG. 5, a communicative link or interface 150 (e.g., a data bus) may be provided between the controller 144 and the components 24, 26, 132, 134, 136, 138, 140, 141, 142, 143 to allow the controller 144 to communicate with such components 24, 26, 132, 134, 136, 138, 140, 141, 142, 143 via any suitable communications protocol (e.g., CANBUS).

It should be appreciated that the controller 144 may correspond to an existing controller(s) of the implement 10 and/or the vehicle 12, itself, or the controller 144 may correspond to a separate processing device. For instance, in one embodiment, the controller 144 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 144 may be performed by a single processor-based device or may be distributed across any number of processor-based devices, in which instance such devices may be considered to form part of the controller 144. For instance, the functions of the controller 144 may be distributed across multiple application-specific controllers, such as an engine controller, a transmission controller, an implement controller, and/or the like.

In several embodiments, the controller 144 may be configured to control one or more components of the implement 10 and/or the vehicle 12 such that the implement 10 is moved across a field to perform an agricultural operation thereon. For example, the controller 144 may be configured to transmit control signals to the engine 24 and/or the transmission 26 of the vehicle 12 (e.g., via the communicative link 150). Such control signals may, in turn, instruct the engine 24 and the transmission 26 to operate such that implement/vehicle 10/12 travels across a field. Moreover, as the implement/vehicle 10/12 travels across the field, the ground-engaging tool(s) (e.g., the shanks 48, the harrow(s) 50, and the basket(s) 54) may perform an agricultural operation, such as a tillage operation, on the field.

Additionally, as the implement/vehicle 10/12 travels across the field, the first electrode(s) 102 supported on the implement 10 may contact the weeds or other unwanted plants/vegetation present within the field. More specifically, when a weed contacts one of the first electrode(s) 102, an electric current generated by the electric power source 126 may be discharged from the first electrode 102 into the weed. The discharged electric current may flow through the weed and its roots into the soil of the field, thereby killing or damaging the weed. For example, the electric current may heat the weed and its roots, which may kill the weed and/or damage the cells of the plant (e.g., by causing the cell walls to burst).

In one embodiment, the controller 144 may be configured to adjust the one or more operating parameters of the electric current supplied to the first electrode(s) 102. More specifically, the controller 144 may be configured to transmit control signals to the transformer 132 (e.g., via the communicative link 150). Such control signals may, in turn, instruct the transformer 132 to modulate or adjust the one or more operating parameter(s) of the electric current supplied to the first electrode(s) 102. Specifically, in one embodiment, the controller 144 may instruct the transformer 132 to increase or step up the voltage of the electric current generated by the electric power source. In another embodiment, the controller 144 may instruct the transformer 132 to modulate the frequency of the electric current generated by the electric power source. For example, the controller 144 may instruct the transformer 132 to modulate frequency of the electric current back and forth between high and low frequencies in a pulsed manner. Such modulation may, in turn, provide improved power efficiency. However, in alternative embodiments, the controller 144 may be configured to instruct the transformer 132 to adjust any other suitable operating parameter(s) of the generated electric current.

The first electrode(s) 102 may be configured to discharge electric current into any plants present within the field. For example, in several embodiments, the first electrode(s) 102 may be configured to discharge electric current into the weeds present within the field. As described above, the specific weeds that are contacted by the first electrode(s) 102 may be based on the position(s) of the second end(s) 114 of the first electrode(s) 102 relative to the surface of the field. However, in alternative embodiments, the first electrode(s) 102 may be configured to discharge electric current into any other unwanted plants or vegetation present within the field.

Furthermore, after the electric current(s) has been discharged into the weeds(s) by the first electrode(s) 102, one or more ground-engaging tools of the implement 10 may be configured to engage such weed(s). Specifically, in several embodiments, as described above, one or more ground-engaging tools (e.g., the shanks 48) may be positioned aft of the first electrode(s) 102. In this respect, after the electric current(s) has been discharged into the weed(s) by the first electrode(s) 102, the shanks 48 may engage or otherwise contact the weed(s) in a manner that kills or further damages the weed(s). For example, the shanks 48 may cut, sever, or otherwise mechanically damage the weed(s) after the electric current(s) has been discharged into such weed(s). Thus, by discharging an electric current(s) into the weed(s) with the first electrode(s) 102 and subsequently mechanically damaging the weed(s) with the ground-engaging tool(s) of the implement 10, the system 100 may provide improved weed/vegetation control, thereby reducing the number and/or coverage of the weeds within the field.

In addition, the flow of electric current to the first electrode(s) 102 may be halted when an unsafe operating condition associated with the implement 10 and/or the vehicle 12 is detected. As described above, the system 100 may include one or more sensors (e.g., the operator presence sensor 136, the soil moisture sensor 138, the vehicle park sensor 140, the frame lift sensor 141, the engine operation sensor 142, and/or the ground contact sensor 143) configured to detect when an unsafe operating condition exists. In this respect, the controller 144 may be configured to receive data from the sensor(s) 136, 138, 140, 141, 142, 143 (e.g., via the communicative link 150). The controller 144 may then be configured to analyze or process the received sensor data to determine when an unsafe operating condition exists. Thereafter, when an unsafe operating condition exists, the controller 144 may be configured to control the operation of the switch 134 to halt the flow the electric current from the electric power source 126 to the first electrode(s) 102. As such, when an unsafe operating condition has been detected, electric current may not be discharged from the first electrode(s) 102 upon contact with the weeds.

Figure 6:
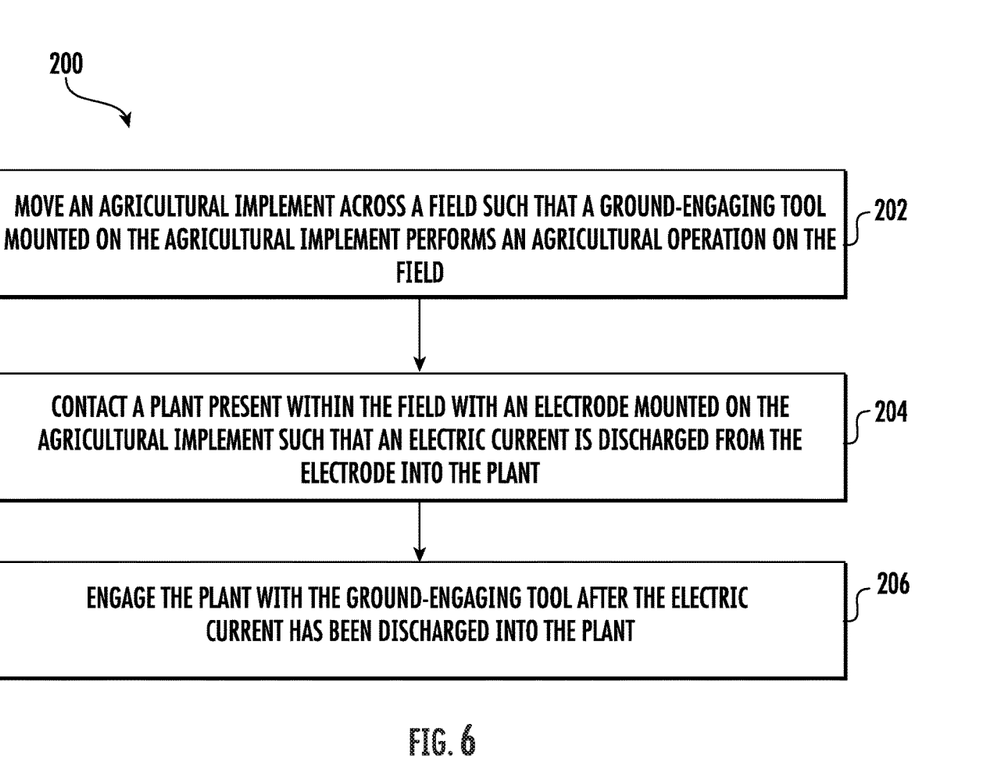
FIG. 6 illustrates a flow diagram of one embodiment of a method for controlling vegetation within a field in accordance with aspects of the present subject matter.

Referring now to FIG. 6, a flow diagram of one embodiment of a method 200 for controlling vegetation within a field is illustrated in accordance with aspects of the present subject matter. In general, the method 200 will be described herein with reference the implement 10 and the vehicle 12 described above with reference to FIGS. 1 and 2, the first and second electrodes 102, 104 described above with reference to FIGS. 3 and 4, and the system 100 described above with reference to FIG. 5. However, it should be appreciated by those of ordinary skill in the art that the disclosed system 100 may generally be utilized with implements having any other suitable implement configuration, vehicles having any other suitable vehicle configuration, electrodes having any other suitable electrode configuration, and/or within systems having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include moving an agricultural implement across a field such that a ground-engaging tool mounted on the agricultural implement performs an agricultural operation on the field. For instance, as described above, the work vehicle 12 may be configured to tow the agricultural implement 10 across a field in a direction of travel 14 such that one or more ground-engaging tools (e.g., the shanks 48, the harrow(s) 50, and/or the basket(s) 54) perform an agricultural operation (e.g., a tillage operation) on the field.

Additionally, at (204), the method 200 may include contacting a plant present within the field with an electrode mounted on the agricultural implement such that an electric current is discharged from the electrode into the plant. For instance, as described above, as the vehicle/implement 10/12 travel across the field, one or more first electrodes 102 may be configured to contact weeds or other unwanted plants/vegetation present within the field. Upon such contact, an electric current(s) may be discharged from the first electrode(s) 102 into the weeds.

Moreover, as shown in FIG. 6, at (206), the method 200 may include. For instance, as described above, the controller 144 may be configured to engaging the plant with the ground-engaging tool after the electric current has been discharged into the plant. For instance, after the electric current(s) may be discharged from the first electrode(s) 102 into the weeds, one or more ground-engaging tools (e.g., the shanks 48) of the implement 10 may contact or otherwise engage such weeds.

It is to be understood that the steps of the method 200 are performed by the controller 144 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 144 described herein, such as the method 200, is implemented in software code or instructions which are tangibly stored on a tangible computer readable medium. The controller 144 loads the software code or instructions via a direct interface with the computer readable medium or via a wired and/or wireless network. Upon loading and executing such software code or instructions by the controller 144, the controller 144 may perform any of the functionality of the controller 144 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling vegetation within a field, the system comprising:
   an implement frame;
   a ground-engaging tool supported on the implement frame, the ground-engaging tool configured to perform an agricultural operation on the field as the implement frame is moved across the field;
   an electrode supported on the implement frame such that, when a plant within the field contacts the electrode as the implement frame is moved across the field, an electric current is discharged from the electrode into the plant;
   a switch configured to selectively halt a flow of the electric current to the electrode;
   a soil moisture sensor configured to capture data indicative of a moisture content the field; and
   a controller communicatively coupled to the switch and the sensor, the controller configured to control the operation of the switch such that the flow of the electric current to the electrode is halted when standing water is detected based on the data captured by the soil moisture sensor.

2. The system of claim 1, wherein the electrode comprises a first end positioned proximal to the implement frame and an opposed second end positioned distal to the implement frame, the second end being positioned above and spaced apart from a top surface of the field.

3. The system of claim 1, wherein the electrode corresponds to a first electrode, the system further comprising:
   a second electrode supported on the implement frame such that the second electrode is in contact with soil present within the field as the implement frame is moved across the field,
   wherein, when the plant within the field contacts the first electrode as the implement frame is moved across the field, the electric current flows from the first electrode through the plant and the soil to the second electrode.

4. The system of claim 1, wherein, when the plant within the field contacts the electrode as the implement frame is moved across the field, the electric current flows from the electrode through the plant and the soil to the ground-engaging tool.

5. The system of claim 1, further comprising:
   an electric power source electrically coupled to the electrode, the electric power source configured to generate the electric current; and
   a transformer electrically coupled to the electric power source and the electrode, the transformer configured to adjust a parameter of the generated electric current.

6. The system of claim 5, wherein the parameter comprises an amplitude or a frequency of the generated electric current.

7. The system of claim 1, wherein the electrode is mounted forward of the ground-engaging tool relative to a direction of travel of the implement frame.

8. The system of claim 7, wherein the ground-engaging tool is configured to perform a tillage operation on the field such that the ground-engaging tool engages the plant after the electric current has been discharged into the plant.

9. The system of claim 8, wherein the ground-engaging tool comprises at least one of a shank, a tine, or a basket.

10. The system of claim 1, wherein the electric current discharged from the electrode into the plant is configured to damage the plant.

11. A tillage implement, comprising:
   a frame;
   a basket supported on the frame, the basket configured to perform a tillage operation of a field as the tillage implement is moved across the field in a direction of travel;
   a first electrode supported on the frame forward of the basket relative to the direction of travel, the basket forming a second electrode such that, when a plant within the field contacts the first electrode as the tillage implement is moved across the field, an electric current is discharged from the first electrode into the plant and flows through the plant and soil within the field to the basket, basket subsequently mechanically engaging the plant;

a switch configured to selectively halt a flow of the electric current to the first electrode;

a soil moisture sensor configured to capture data indicative of a moisture content of the field; and a controller communicatively coupled to the switch and the soil moisture sensor, the controller configured to control the operation of the switch such that the flow of the electric current to the first electrode is halted when standing water is detected based on the data captured by the soil moisture sensor.

12. The tillage implement of claim 11, wherein the first electrode comprises a first end positioned proximal to the frame and an opposed second end positioned distal to the frame, the second end being positioned above and spaced apart from a top surface of the field.

* * * * *